United States Patent [19]

Mulholland et al.

[11] Patent Number: 5,082,344

[45] Date of Patent: Jan. 21, 1992

[54] ADAPTER ASSEMBLY WITH IMPROVED RECEPTACLE FOR A PUSH-PULL COUPLING TYPE OF OPTICAL FIBER CONNECTOR

[76] Inventors: Denis G. Mulholland, 2916 Spring Valley Rd., Lancaster, Pa. 17601; Ronald R. Schaffer, 4000 Elmerton Ave., Harrisburg, Pa. 17107; Gary N. Warner, 7617 Fishing Valley Rd., Harrisburg, Pa. 17112

[21] Appl. No.: 577,963

[22] Filed: Sep. 5, 1990

Related U.S. Application Data

[63] Continuation-in-part of Ser. No. 491,755, Mar. 9, 1990.

[51] Int. Cl.$^5$ ............................................... G02B 6/38
[52] U.S. Cl. ............................................... 385/60
[58] Field of Search ..................... 350/96.21, 96.20; 439/731, 732, 686–687, 695

[56] References Cited

U.S. PATENT DOCUMENTS

| | | | |
|---|---|---|---|
| 2,756,402 | 7/1956 | Haworth et al. | 439/687 |
| 3,514,744 | 5/1970 | Hollander | 439/687 |
| 4,611,887 | 9/1986 | Glover et al. | 350/96.21 |
| 4,715,675 | 12/1987 | Kevern et al. | 350/96.20 |
| 4,762,389 | 8/1988 | Kaihara | 350/96.21 |
| 4,779,950 | 10/1988 | Williams | 350/96.12 |
| 4,798,440 | 1/1989 | Hoffer et al. | 350/96.20 |
| 4,872,736 | 10/1989 | Myers et al. | 350/96.20 |

FOREIGN PATENT DOCUMENTS 62-26141 2/1987 Japan .
60-218932 4/1987 Japan .

OTHER PUBLICATIONS

"SC-Type Single Mode Optical Fiber Connectors," Journal of Light and Technology, vol. 7, #11, Nov. 1989, pp. 1689–1696.

*Primary Examiner*—Georgia Epps

[57] ABSTRACT

An adapter assembly for optical fiber connectors comprises a base having a profiled axial bore, a receptacle housing and a receptacle. The receptacle housing has at least one four sided compartment structure extending forwared from the base and open at a front receiving end. Within the housing is the receptacle comprising a socket extending from the adapter base and having bore a axially alinged with the bore of the base to form an extension thereof and. The receptacle is adapted to receive an alignment ferrule of an optical fiber connector. The receptacle further has two catch pieces of cantilever form extending from the base parallel to and on opposing sides of the longitudinal axis of the socket. The catch pieces terminate in protrusions and lip structures for intermating with a push-pull type of optical fiber connector. Each lip structure of each catch piece has at least three inwardly beveled surfaces leading from the lip edge of each structure forward toward the interconnection with the push-pull optical fiber connector to facilitate lead-in of the connector during connection to the adapter assembly.

9 Claims, 3 Drawing Sheets

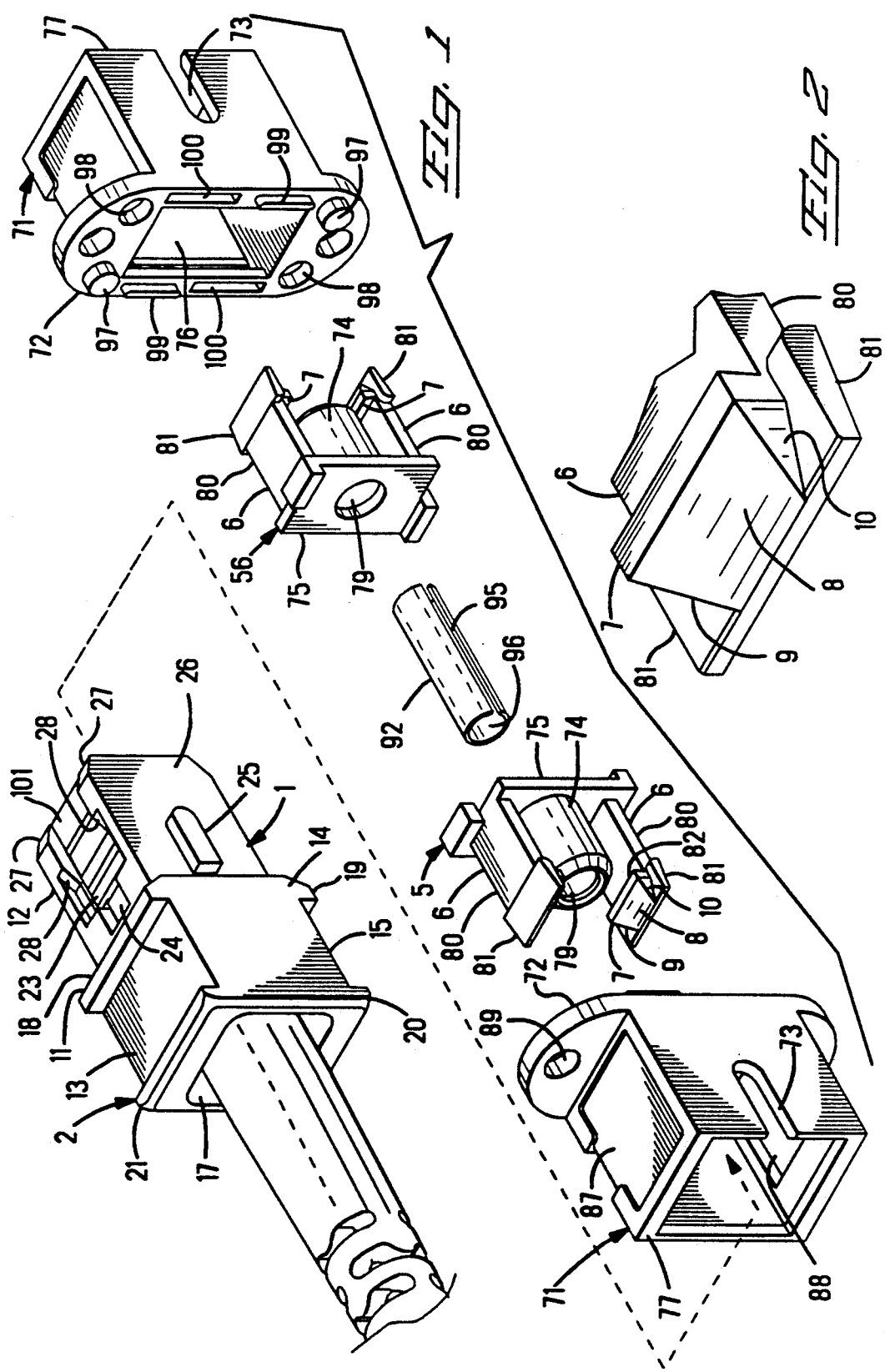

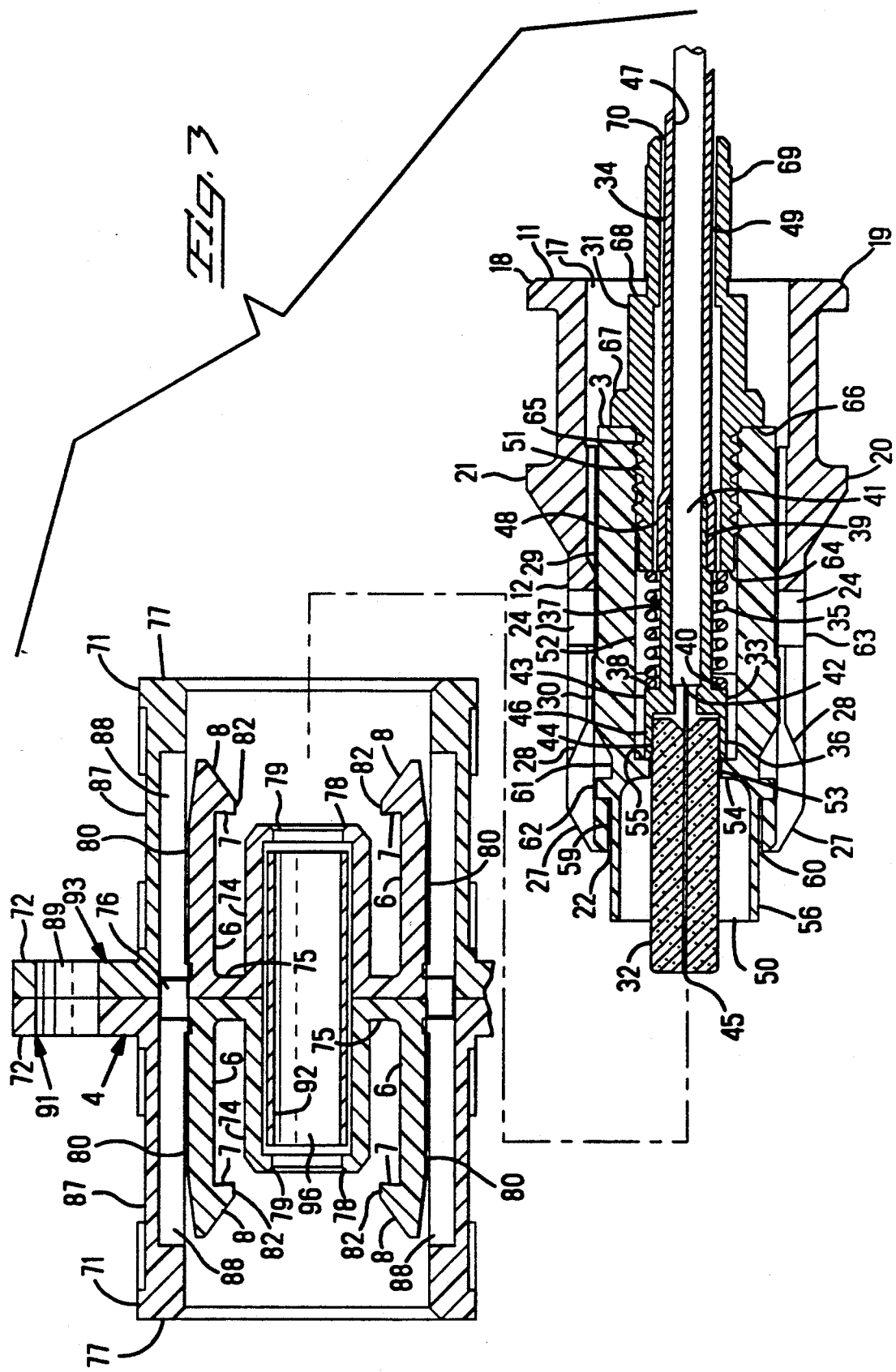

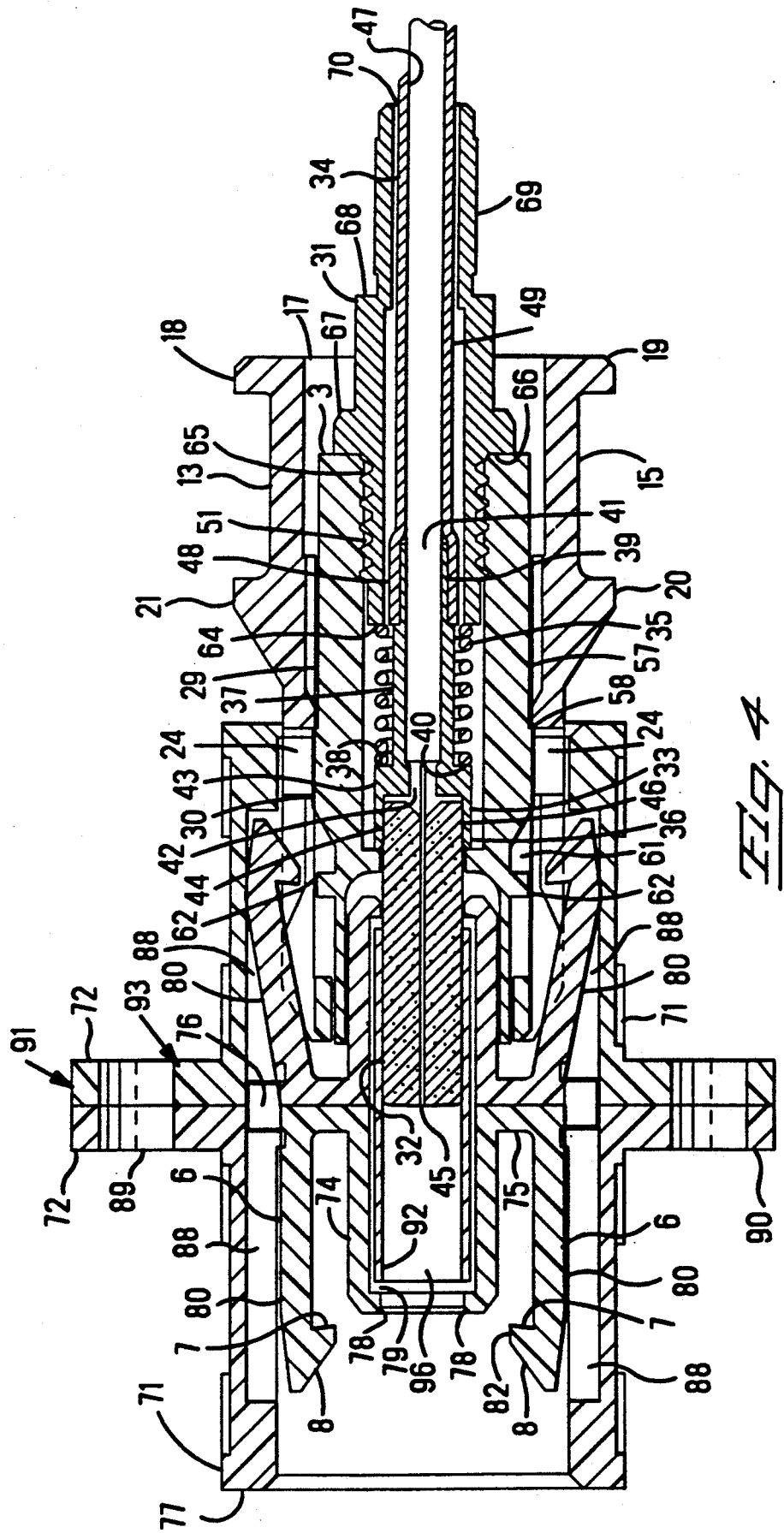

ADAPTER ASSEMBLY WITH IMPROVED RECEPTACLE FOR A PUSH-PULL COUPLING TYPE OF OPTICAL FIBER CONNECTOR

FIELD OF THE INVENTION

This application is a continuation in part of Mulholland et al., U.S. patent application Ser. No. 491,755, filed Mar. 9, 1990. The present invention relates to optical fiber connectors for optical communications applications and more particularly to an adapter assembly for a push-pull coupling type optical fiber connector.

BACKGROUND OF THE INVENTION

Push-pull optical fiber connectors are known, such as that disclosed by Umeki et al, Japanese Showa 60-218932. This connector includes an adapter equipped with an alignment sleeve and resilient catch pieces. The pieces are in cantilever form with protrusions and a claw attached to the tip of the form. The connector also includes a frame that contains an integrated ferrule and a through passageway from the rear to the front of the ferrule. The frame has protruding parts that are caught by claws of the resilient catch pieces of the adapter. A resilient inner tube shaped in the form of a round tube has an inside diameter almost equal to the outside diameter of the optical fiber cable and an outside diameter almost equal to the hole in the rear portion of the plug frame. A cord tube has a flexible part at its front end which, when inserted into the hole in the rear of the plug frame, is secured to the frame by the bending of the flexible part. The plug frame also has a finger grip mounted on its outside with raised parts. When the ferrule of the plug frame is inserted into or pulled from the alignment sleeve, the raised parts of the plug frame contact the protrusions of the cantilever form and push the resilient claws apart allowing the protrusions to pass. The plug frame may have a finger grip housing which is able to slide forward and backward with respect to the plug frame and, additionally, which has raised parts which release the catch of claws on the protruding parts of the plug frame when the finger grip housing is moved backward.

The present invention relates to a particular adapter for disconnect connection of an optical fiber of the push-pull coupling type of connector such as disclosed by Umeki et al, Japanese Showa 60-218932; Iwasa et al, Japanese Showa 62-26141; Kaihara et al, U.S. Pat. No. 4,762,389; and Myers et al, U.S. Pat. No. 4,872,736. Particularly, the invention relates to the adapter for the push-pull coupling type of connector as disclosed by Mulholland et al, U.S. patent application Ser. No. 491,755, filed Mar. 9, 1990, which disclosure is incorporated herein by reference.

One of the distinct advantages of push-pull connectors is their ease of connection to other connecting devices, particularly through the means of the adapter assemblies of Umeki et al. and Mulholland et al. It is the ability of these connectors to seat precisely, quickly and easily to the adapter assemblies, and without the need of crimping tools, adhesives or the like, that make these push-pull connectors particularly advantageous over other optical fiber connectors known in the art.

Sugita et al., in an article in the *Journal of Light and Technology*, Volume 7, No. 11, (November, 1989), pages 1689-1696, entitled "SC-Type Single Mode Optical Fiber Connectors", describes the coupling mechanism and coupling forces involved during the mating of push-pull type connectors and adapters. Noted is that it is essential that the SC connector provide easy insertion and removal operation, and further, that a strong coupling interrelationship be established between the plug and the adapter. Further, as the article points out, the most important point for satisfying these objectives is finding the optimum design for the adapter part identified in the article as the spring lever, which is the same piece as is described in various of the patents as the resilient catch piece Umeki et al., describes the resilient catch piece, provided in pairs on both sides of a support of the adapter, as terminating in protrusions and claws. Mulholland et al. describes the catch pieces as terminating in protrusions and lip structures. In either instance, whether described as a claw or a lip, the structure has a beveled surface which facilitates the fitting of the catch piece into a depression or slot of the connector during insertion of the connector into the adapter. During intermating of adapter and connector, the bevel of the protrusion supporting the lip contacts an upward slope of the front edge of the connector which opens the catch piece by pushing against the beveled surface causing the catch piece to rise and then to seat with snap-in connection to a connector slot. The present invention relates to an adapter assembly of improved design whereby the lip structures are characterized by at least three inwardly beveled surfaces leading from the lip edge of each structure forward toward the interconnection with the connector. The additional beveled surfaces provide an orienting feature for the longitudinal alignment of the connector face during intermating with the adapter.

SUMMARY OF THE INVENTION

The present invention relates to an adapter assembly for optical fiber connectors. The connectors include central passageway, alignment ferrule and optical fiber. The adapter assembly comprises a base having profiled axial bore. Further the adapter assembly includes a receptacle housing having at least one four sided compartment structure extending forward from the base and open at a front receiving end. The receptacle housing has within, a receptacle comprising a socket extending from the base and within the receptacle housing. The receptacle has a bore axially aligned with the bore of the base to form an extension thereof and adapted to receive an alignment ferrule of the optical fiber connector. The receptacle further has two catch pieces of cantilever form extending from the base parallel to and on opposing sides of the longitudinal axis of the socket. The catch pieces terminate in protrusions and lip structures for intermating with a push-pull type of optical fiber connector. According to the present invention, the receptacle further is characterized in that each lip structure of each catch piece has at least three inwardly beveled surfaces leading from the lip edge of each structure forward toward the interconnection with the push-pull optical fiber connector. The particular three surface bevel facilitates lead-in of the connector during connection to the adapter assembly. The particular three surface bevel is applicable to lip structures of adapters for both simplex and duplex type of connectors.

Each forward edge of each side of the compartment structure of the adapter assembly may be beveled to facilitate lead-in of the push-pull optical fiber connector during connection to the adapter assembly. The socket of the receptacle may have an annular beveled front edge. Each of the catch pieces may further comprise a tab body and may terminate in protrusion and lip structure. Each protrusion may be wider than each tab body of each catch piece.

The optical fiber connector comprises an optical fiber plug assembly. The plug assembly includes a plug housing with spacing through its body at a surface of a forward section and with defined exterior profile at a rearward section. A connector assembly is accommodated by and substantially within the plug housing. The connector assembly has, disposed at one exterior surface thereof, ridge and slot and, in conjunction therewith, tab. The ridge, slot and tab are exposed through the spacing at the surface of the forward section of the plug housing. Further included is a ferrule for fixing an optical fiber on a center axis thereof and accommodated within the connector assembly. The adapter assembly is attached to the optical fiber connector with the front end of the fiber optical member disposed through the socket and the bore of the base. Each of the resilient catch pieces has lip structure seated within a respected slot of the connector assembly.

In another embodiment, the present invention is directed to a coupling assembly comprising a first adapter assembly and a second adapter assembly, each according to the adapter assembly of the present invention. The first and second adapter assemblies are intermated one to the other, front face to front face. In this intermated coupling assembly, the sockets of the adapter assemblies define a common axial bore. The assembly further includes a sleeve for receiving the alignment ferrule of the connector; the sleeve captivated within the common axial bore of the sockets.

In connection, the plug assembly of the push-pull connector is inserted into the adapter housing with each beveled leading edge of each face of the plug contacting a respective beveled leading edge of each lip of each resilient catch piece causing the catch piece to rise along the bevel of each face to seat within each of the slots of the front shell portion of the plug assembly. As taught in Iwasa et al., the lip of the resilient catch piece has a single beveled leading edge. It has been found by the present invention, that the ease of connection between the plug assembly of the connector and the receptacle of the adapter assembly, may be improved substantially by the providing of additional side bevel surfaces to the lip of the catch pieces. With this improvement, the plug assembly exactly seats to the adapter assembly without problems of misalignment.

BRIEF DESCRIPTION OF THE DRAWINGS

FIG. 1 is a perspective view, partially exploded of a push-pull optical fiber connector and a pair adapters.

FIG. 2 is a perspective view, enlarged, of the lip structures of the receptacle of the adapter of the present invention.

FIG. 3 is a sectional view of the connector and adapter assemblies of FIG. 1.

FIG. 4 is a sectional view of the connector connected to one of the pair of adapter assemblies of FIG. 1.

DESCRIPTION OF A PREFERRED EMBODIMENT

The preferred embodiment of the present invention, as shown in FIGS. 1, 2, 3 and 4, is an adapter assembly 4 for intermating with an optical fiber connector 1 of the push-pull type comprising a plug housing 2 and a connector assembly 3. Each adapter 4 has a receptacle 5 with catch pieces 6 having lips 7 with at least three beveled leading surfaces 8, 9 and 10.

Referring to FIGS. 1, 2, 3 and 4, plug housing 2 of the optical fiber connector 1 has rear section 11 and forward section 12. Rear section 11 is a tubular sleeve comprising four flat surface areas 13, 14, 15, and 16 (not shown) forming passageway 17 for receiving connector assembly 3. Top surface 13 and bottom surface 15 have corresponding raised ridges 18 and 19 and 20 and 21 at edges of each surface 13 and 15.

Forward section 12 is integral with rear section 11 to form a single body, the plug housing 2. Forward section 12 is also a tubular sleeve with passageway 22. It has shaped openings 23 with notch 24 to receive and dispose slots 61, ridges 62 and raised tabs 63 of connector assembly 3 as hereinafter described and tabs 25 on opposing faces 26 for fit to the slots 87 of adapter 4, again as hereinafter described. Forward section 12 is beveled at front leading edges 27 and following edges 28.

As shown in FIGS. 1, 3 and 4, the connector assembly 3 includes a bipartite shell 29 comprising a front plastic shell portion 30 and a rear metal shell portion 31. Also shown is ceramic alignment ferrule 32, having bore 45, metal body 33, sheath 34, and biasing spring 35 of coil form.

The body 33 includes an enlarged front end 36 with an external hexagonal cross section, a reduced external diameter intermediate portion 37 intersecting a rear facing shoulder 38 of the enlarged front end 36, and a rear end 39 with a reduced external diameter. The coil spring 35 is assembled as shown, to encircle the reduced external diameter portion 37 with a front end 40 of the coil spring 35 engaged and biased against the shoulder 38. The body 33 further includes an axial passageway 41 extending from the rear end 39. The passageway 41 has a reduced diameter, funnel entryway 42 extending through an internal transverse web 43, and an enlarged diameter counterbore 44 in the front end 36.

The ceramic alignment ferrule 32 has a central longitudinal bore 45 aligned with the entryway 42. A rear end 46 of the ferrule 32 is press fit in the counterbore 44 of the body 33.

The sheath 34 is a length of flexible plastic or metal tubing having a hollow interior 47, a front end 48 assembled to encircle the reduced diameter rear end 39 of the body 33, and a rear end portion 49. The sheath 34 is held on the body 33 by friction or interference fit.

The front shell portion 30 includes an axial cavity 50 having an enlarged diameter rear end 51 that is internally threaded, an intermediate portion 52 having a hexagon shaped periphery, and a reduced diameter front portion 53 extending through an end wall 54 of the front body portion 30. Enlarged diameter rear end 51 is internally threaded for fit of rear shell portion 31 as hereinafter described. However, it should be pointed out that although this present embodiment shows attachment by threading, rear shell portion 31 may be attached to front shell portion 30 by other conventional means such as by means of glue or adhesive or ultrasonic connection of one part to the other. A rear facing, radially extending internal shoulder 55 is defined at the intersection of the diameter portions 52 and 53. A rectangular hood 56 with an enlarged internal diameter extends forwardly from the front of the end wall 54. Further, the front shell portion 29 includes a rear end 57 with a slightly reduced external diameter intersecting a rear facing external shoulder 58.

Front shell portion 30 at the upper 59 and lower 60 surfaces of its outer profile has slots 61 and ridges 62 for engaging the lips 7 of resilient catch pieces 6 of adapter 4, described below, and tabs 63 which impose outwardly. When connector assembly 3 is fitted within plug housing 2, slots 61 and ridges 62 are exposed by shaped openings 23 of the forward section 12 of plug housing 2. Tabs 63 nestle into notches 24 of the shaped openings 23 to prevent connector assembly 3 from escaping rearwardly out of plug housing 2.

The rear metal shell 31 includes a front end 64, an externally threaded forward portion 65 extending to a front facing external shoulder 66 defined by an exterior circumferential flange 67, a rear facing external shoulder 68 forwardly of a reduced external diameter end portion 69. The reduced diameter end portion 69 defines an optical fiber cable anchoring portion. Further, rear shell portion 30 has axial passageway 70.

With reference to FIGS. 1, 2, 3 and 4, is shown the particular adapter assembly 4 of the present invention. The adapter assembly 4 includes a base 72 having a rectangular port 76. Further included is a receptacle housing 71 in the form of at least one four sided compartment structure extending forward from the base 72 and open at a front receiving end 77 and having keying slots 73. The receptacle housing 71 has, within its compartment structure, a receptacle 5 comprising a base 75, a socket 74 extending from the base 75 and within the receptacle housing 71. The socket 74 has a bore 79 axially aligned with the bore 79 of complimentary socket 74 to form an extension thereof. The socket 74 has beveled front lip 78 and is adapted to receive the alignment ferrule 32 of the optical fiber connector 1. The receptacle 5 further has two catch pieces 76 of cantilever form extending from the base 75 parallel to and on opposing sides of the longitudinal axis of the socket 74. The catch pieces 6 comprise a tab body 80 and terminate in protrusions 81 and lip structures 7 for intermating with the push-pull type of optical fiber connector 1. In accord with the present invention, each said lip structure 7 of each catch piece 6 has at least three inwardly beveled surfaces 83, 84, 85 leading from the lip 82 of each structure 82 and inclining forward toward the interconnection with said push-pull optical fiber connector 1 to facilitate leading of the connector 1 during connection to the adapter assembly 4.

Receptacle housing 71 is further characterized by inset planes 87 at the outside top and bottom of the structure 71, and key slot 73 to the side. Within the interior of the compartment-like structure 71, at top and bottom, are spacings 88 which accommodate the deflections of protrusions 81 during an intermating with the push-pull type of connector 1. Finally, the receptacle housing 71 has ports 89, 90 for the accepting of a securing bolt or the like for attachment to another element, such as a complimentary adapter assembly 4 as shown.

Assembly of the connector assembly 3 to an optical fiber cable is described by Gerace et al., U.S. patent application Ser. No. 07/159,151, published EPC Specification No. 0330399, 30 August 1989 and by Mulholland et al., U.S. patent application Ser. No. 491,755, filed Mar. 9, 1990. Both of these disclosures are incorporated herein by reference. After connection of the optical cable to the connector assembly 3, the holder 31 and the biasing spring 35 are assembled together and are assembled into the cavity 50 of the front shell portion 30, with the alignment ferrule 32 projecting through the end wall 54, forward of the end wall 54, and the hood 56, and with the sheath 34 projecting outward of the rear end 69 of the rear shell portion 31. The axial passageway 70 of the rear shell portion 31 is slidable assembled over the sheath 34 and is threadably advanced along the internally threaded rear end 57 of the front body portion 30 until the shoulder 66 engages the rear end 57 of the front shell portion 30. The biasing spring 35 is in compression between the front end 64 of the rear shell portion 31 and the shoulder 38 of the body 33. Thereby the metal body 33 is biased forward by the spring 35 and is mounted for axial slidable displacement and reciprocation with respect to the shell 29. The hexagonal front end 36 of the body 33 is confined by the hexagonal periphery of the cavity 50 to prevent rotation of the body 33 in the cavity 50.

Shown in FIGS. 3 and 4, is a coupling bushing 91 which is a body comprising two adapter assemblies 4 and 93 mated back to back. The bushing 91 is assembled by the first step of inserting slotted sleeve 92 to within the bore 79 of socket 74 through base 75 to within socket 74 of a first half structure, adapter assembly 93 of bushing 91. Socket 74 of receptacle 5 of adapter 4 is then fitted over and to encompass a portion of the slotted sleeve 92 extending from the bore 79. The slotted sleeve 92 is loosely accommodated within the continuous axial bores 79 of both the half structure 93 and adapter assembly 4. The adapter assembly 4 and the first half structure 93 are then joined back to back to captivate the slotted sleeve 92 and to form coupling bushing 91 for the interconnection of push-pull connectors. The adapter assembly 4 and half structure 93, as shown in the present embodiment, are characterized by nubs 97, recesses 98, ridges 99 and slots 100, which interconnect as taught by the present inventors in co-pending U.S. application Ser. No. 07/613,194.

In connection, the optical fiber connector is inserted into the front receiving end 77 of the receptacle housing 71 of the adapter assembly 4. Ceramic alignment ferrule 32 is inserted through bore 96 of slotted sleeve 92 and into socket 74. As the ferrule 32 is inserted, each beveled leading edge 27 of forward section 12 of connector assembly 3 contacts a respective beveled protrusion 81 of each resilient catch piece 6, causing the catch piece 6 to rise along the bevel 27 and causing each lip structure 7 to travel over each ridge 62 and to seat within each of slot 61 of front shell portion 30. To properly mate, each lip structure 7 must pass unobstructed through the spacing 101 between the bevels 27. If the connector assembly is inserted at an angle such that the lip strikes the shoulders formed by beveled surfaces 27, then beveled surfaces 84 or 85 of each lip 7 slip against the shoulders, providing a lateral orientation to cause the connector assembly to realign so as to enter the spacing 101 at a right angle approach.

On disconnect of the fiber connector 1 from the adapter assembly 4, rearward force causes beveled following edges 28 to impose against each protrusion 81 of each catch piece 6, to lift each catch piece 6 thus disengaging each of lip 7 from respective slot 61 and ridge 62 of front shell portion 30 thereby permitting withdrawal of the plug assembly 2 from the adapter assembly 4.

With the embodiment shown, each simplex connector 1 is held in defined polarized relationship with adapter assembly 4 and hence with each connecting connector by means of the seat of key tabs 25 to key slots 73 of adapter 4. It should be understood that it is within the scope of this invention to provide simplex connectors interconnected at a ninety degree orientation from that shown in the drawings. In such instance, each of key tab 25 would be presented at the top and bottom of plug 2 and assembly 4 would be characterized by tab slots 73 on each of top and bottom walls. Then, referring to FIG. 1, catch pieces 6 would be oriented ninety degrees within housing 71 of adapter 4 so as to mate with profiled surfaces of plug housing 2 characterized by shaped openings 23, front edges 27, following edges 28, and notches 24 located side to side of the plug housing 2.

While what has been described constitutes a presently preferred embodiment of the invention, it should be recognized that the adapter assembly 4 of the present invention may take numerous other forms. For example, included within the scope of this invention are duplex adapters for connection of one duplex connector to another. Exemplary duplex connectors are disclose in Mulholland et al., U.S. patent application Ser. No. 491,755, filed Mar. 9, 1990.

Accordingly, it should be understood that the invention is to be limited only insofar as required by the scope of the following claims.

We claim:

1. An adapter assembly for optical fiber connectors, the connectors including central passageway, alignment ferrule and optical fiber, the adapter assembly comprising; a base having profiled axial bore; a receptacle housing having at least one four sided compartment structure extending forward from said base and open at a front receiving end, and having therein; a receptacle comprising; a socket extending from said base within said receptacle housing and having bore axially aligned with the bore of the said base to form an extension thereof and adapted to receive an alignment ferrule of said optical fiber connector; said receptacle further having two catch pieces of cantilever form extending from the base parallel to and on opposing sides of the longitudinal axis of the socket and terminating in protrusions and lip structures for intermating with a push-pull type of optical fiber connector; the receptacle further characterized in that each said lip structure of said catch piece has at least three inwardly beveled surfaces leading from the lip edge of each said structure forward toward the interconnection with said push-pull optical fiber connector to facilitate lead-in of the connector during connection to the said adapter assembly.

2. The adapter assembly of claim 1 wherein each forward edge of each side of the compartment structure of the adapter assembly is beveled to facilitate lead-in of the push-pull optical fiber connector during connection to the adapter assembly.

3. The adapter assembly of claim 1 wherein the socket has annular beveled front edge.

4. The adapter assembly of claim 1 wherein each said catch piece comprises a tab body and terminates in said protrusion and lip structure.

5. The adapter assembly of claim 3 wherein each protrusion is wider than each tab body of each catch piece.

6. An adapter assembly according to claim 1, 2, 3, 4 or 5 wherein the optical fiber connector comprises an optical fiber plug assembly, the plug assembly including a plug housing with spacing through its body at a surface of a forward section and with defined exterior profile at a rearward section, a connector assembly accommodated by and substantially within said plug housing, the connector assembly having, disposed at one exterior surface thereof, ridge and slot and, in conjunction therewith, tab; said ridge, slot and tab exposed through the spacing at the surface of the forward section of said plug housing, and ferrule for fixing an optical fiber on a center axis thereof and accommodated within the connector assembly.

7. An adapter assembly according to claim 6 wherein said adapter is attached to said optical fiber connector with front end of the fiber optical member disposed through the socket and the bore of said base and with each of the said resilient catch pieces having lip structure seated within respected slot of said connector assembly.

8. An intermated coupling assembly comprising a first adapter assembly and a second adapter assembly, each according to the adapter assembly of claim 1, the first and second adapter assemblies intermated one to the other, front face to front face.

9. An intermated coupling assembly according to claim 8 wherein said sockets of the said adapter assemblies define a common axial bore and wherein said assembly further includes a sleeve for receiving the alignment ferrule of the connector and said sleeve captivated within the said common axial bore of the sockets.

* * * * *

UNITED STATES PATENT AND TRADEMARK OFFICE
CERTIFICATE OF CORRECTION

PATENT NO. : 5,082,344

DATED : January 21, 1992

INVENTOR(S) : Denis G. Mulholland, et. al.

It is certified that error appears in the above-identified patent and that said Letters Patent is hereby corrected as shown below:

On the Title page, item [76], Inventor, R. Schaffer's zip code should be --17109--not "17107".

Signed and Sealed this

Twenty-fifth Day of May, 1993

Attest:

MICHAEL K. KIRK

Attesting Officer

Acting Commissioner of Patents and Trademarks